(12) United States Patent
Brown et al.

(10) Patent No.: US 6,380,649 B1
(45) Date of Patent: Apr. 30, 2002

(54) GALVANOMETER UNIT

(75) Inventors: David C. Brown, Northborough; Felix Stukalin, Framingham, both of MA (US)

(73) Assignee: GSI Lumoniss Corporation, Billerica, MA (US)

( * ) Notice: Subject to any disclaimer, the term of this patent is extended or adjusted under 35 U.S.C. 154(b) by 0 days.

(21) Appl. No.: 09/432,244

(22) Filed: Nov. 2, 1999

(51) Int. Cl.[7] .................. H02K 11/00; H01G 5/00; R02K 33/00; G05B 1/06
(52) U.S. Cl. .............. 310/68 C; 310/68 B; 310/36; 361/289; 318/119; 318/662
(58) Field of Search ............... 310/15, 16, 17, 310/19, 36, 68 B, 68 C; 361/298.1, 298.5, 289, 299.1; 318/119, 560, 652, 662

(56) References Cited

U.S. PATENT DOCUMENTS

| | | | | |
|---|---|---|---|---|
| 3,732,553 A | * | 5/1973 | Hardway, Jr. .............. 340/200 |
| 4,364,000 A | * | 12/1982 | Burke, Jr. .................. 318/128 |
| 4,642,496 A | * | 2/1987 | Kerviel et al. ............. 310/68 B |
| 4,694,235 A | * | 9/1987 | Flowers ....................... 318/662 |
| 4,874,215 A | * | 10/1989 | Montagu ...................... 350/6.6 |
| 5,099,386 A | * | 3/1992 | Stokes et al. ................ 361/298 |
| 5,225,770 A | * | 7/1993 | Montagu ..................... 324/146 |
| 5,369,322 A | * | 11/1994 | Maruyama et al. ........... 310/39 |
| 5,402,048 A | * | 3/1995 | Rao ............................ 318/560 |
| 5,537,109 A | * | 7/1996 | Dowd .................... 340/870.37 |
| 5,910,781 A | * | 6/1999 | Kawamoto et al. .... 340/870.37 |
| 6,031,306 A | * | 2/2000 | Permuy ...................... 310/67 R |
| 6,124,654 A | * | 9/2000 | Siraky ........................ 310/67 R |
| 6,218,803 B1 | * | 4/2001 | Montagu et al. ............ 318/662 |

\* cited by examiner

Primary Examiner—Elvin Enad
Assistant Examiner—Dang Dinh Le
(74) Attorney, Agent, or Firm—Cesari and McKenna, LLP

(57) ABSTRACT

A galvanometer unit comprises a limited-rotation motor with a load element such as a mirror attached to a shaft extending from the motor. In a servo loop that controls the angular position of the mirror, a position-sensor attached to the shaft provides position feedback information. The sensor includes a rotor which is positioned at the null point of the fundamental torsional resonance mode of the rotating system, thereby essentially eliminating feedback components resulting from the resonance.

6 Claims, 6 Drawing Sheets

GALVANOMETER UNIT

FIELD OF THE INVENTION

This invention relates to an improved galvanometer unit. More particularly, it relates to a galvanometer unit incorporating a limited-rotation motor having an improved bearing life and improved position control for high-speed actuation.

BACKGROUND OF THE INVENTION

A galvanometer unit to which the invention relates includes a limited-rotation electro magnetic motor having a permanent-magnet armature that interacts with the fields generated by currents through field windings. Motors of this type are often used in scanners, in which a light-directing component, usually a mirror, is attached to the motor shaft and reciprocal rotation of the motor causes a light beam directed at the mirror to sweep back and forth over a target surface.

Since the motor undergoes limited rotation, the rotor, which comprises the armature and associated shafts, may be mounted on a flexural pivot that acts as a torsional spring for motor rotation. However, the motor to which the present invention relates incorporates bearings to support the armature and the limitation on rotation is provided by the servo system that controls the angular position of the mirror. Galvanometer motors of this type have in the past suffered from bearing wear, which degrades the accuracy of light beam direction, ultimately reaching an unacceptable level and requiring replacement of the scanner.

Another problem encountered with prior galvanometer motors is the torsional resonance of the rotating system, i.e. the rotor, the load, e.g. mirror, and any other rotating components. A position sensor is connected to the shaft to provide position feedback in the servo loop and the output of the sensor includes components resulting from resonant twisting of the shaft. There are several resonance modes and the pass band of the servo system must be well below the lowest resonance frequency to avoid unwanted feedback causing instability of the servo system. Other problems to which the invention is directed are the desirability of stability and high sensitivity of the position servo. A further problem is the need for uniformity of temperature in the rotating system and efficient removal of heat from the motor.

SUMMARY OF THE INVENTION

A galvanometer unit incorporating the invention supports the armature on ball or roller bearings. A servo controller that rotates the scanner to commanded angular positions is programmed to cause the rotor to undergo one or more complete revolutions from time to time. This changes the angular relationships between the bearing balls or rollers and the inner and outer bearing races. Bearing wear is thus shifted to different portions of the races and wear is distributed around the races instead of being concentrated in a single angular span. This materially increases bearing life.

Preferably, also, the position sensor in the servo system is located at a null point of the fundamental resonance mode of the rotating system. Thus there is negligible feedback in the servo system from this resonance. This permits operation of the scanner at significantly higher speeds.

More specifically, the rotating system exhibits a fundamental torsional resonance mode in which the instantaneous angular velocities of the motor armature and the mirror are in opposite directions. The frequency of this mode, as well as the frequencies of higher order modes, is a function primarily of the rotational inertias and torsional stiffnesses in the rotating system. The fundamental mode has a single null at an axial position on the shaft determined by the physical parameters of the rotating components. The output of a sensor located at the null position contains a negligible frequency component corresponding to the fundamental resonance mode. Therefore, the pass band of the servo system, one of whose inputs is the angular position indicated by the sensor, can be increased to a frequency closer to the fundamental resonance than is practical in prior systems.

A further improvement is provided by the use of a capacitive position sensor that is thinner than prior sensors. This reduces the length of the shaft linking the scanning mirror to the motor, which results with a corresponding increase in shaft stiffness. This in turn increases the various resonances, including the fundamental resonance frequency, again permitting an increase in the pass band of the servo system.

A novel rotor structure and method of fabricating it contribute both to torsional stiffness and high electrical and thermal conductivity between the armature and the shafts in the rotating system. This facilitates grounding of the rotor to prevent the buildup of static charges and it also provides for temperature uniformity so as to minimize differential thermal expansion.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
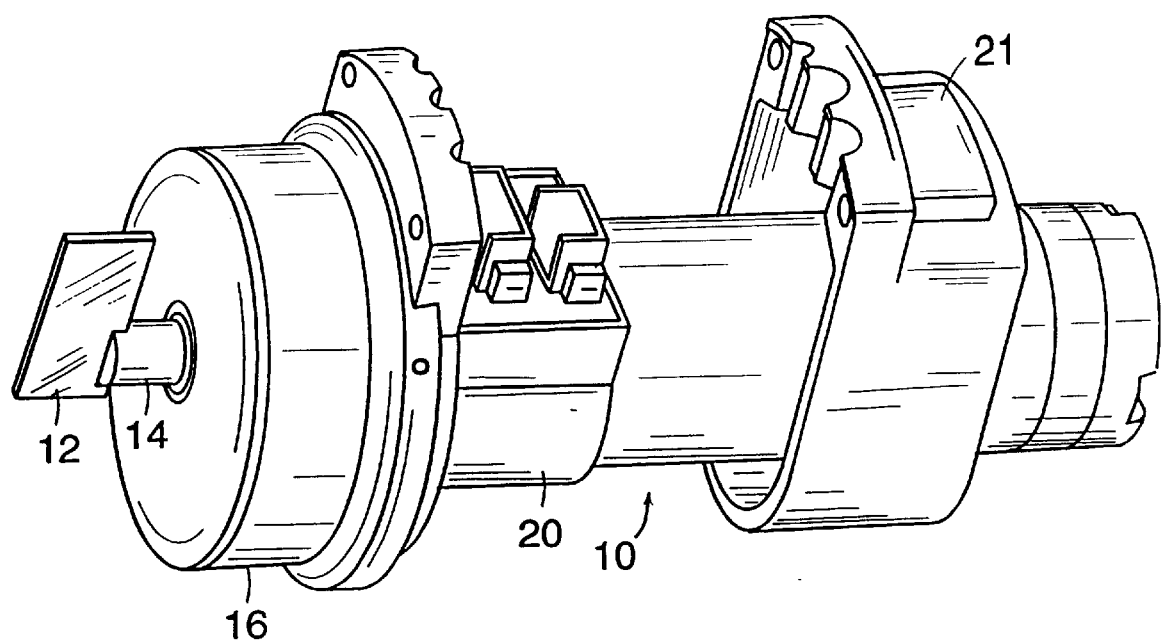
FIG. 1 is an isometric partly exploded, view of a limited-rotation system incorporating the invention, along with a schematic view of the controller.
Figure 1:
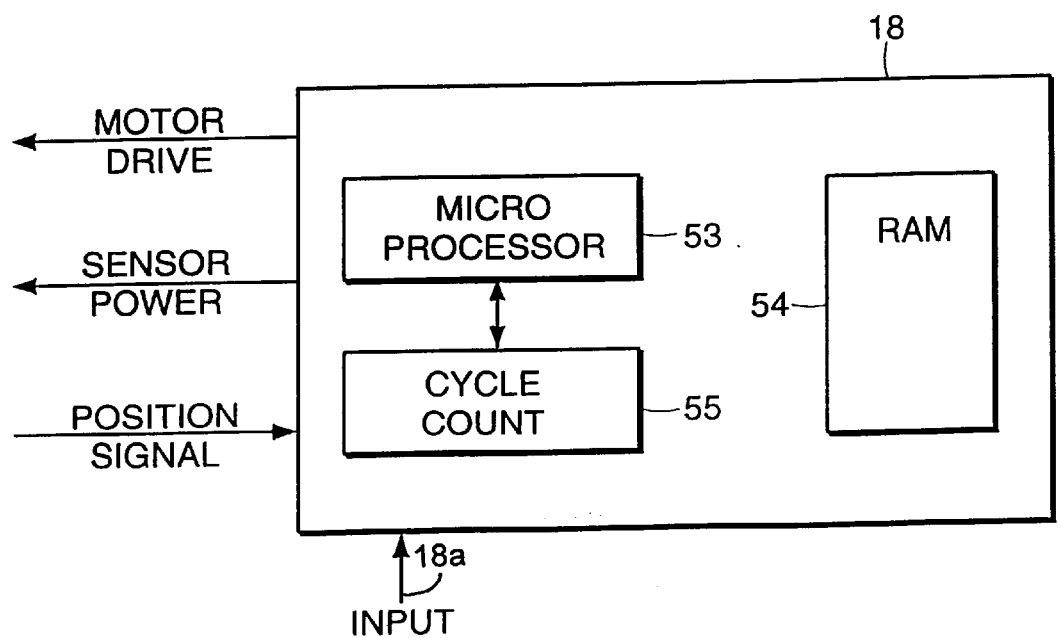

As shown in FIG. 1, a scanner incorporating the invention includes a motor 10 that reciprocally rotates a beam-directing device, such as a mirror 12, by way of a shaft 14. The shaft 14 passes through a position sensor 16 that provides electrical signals indicative of the angular position of the mirror 12. A controller 18 connects to the motor and sensor through a terminal block 20 on the motor. A cooling module 21 is attached to the motor 10 to remove heat therefrom.

Figure 2:
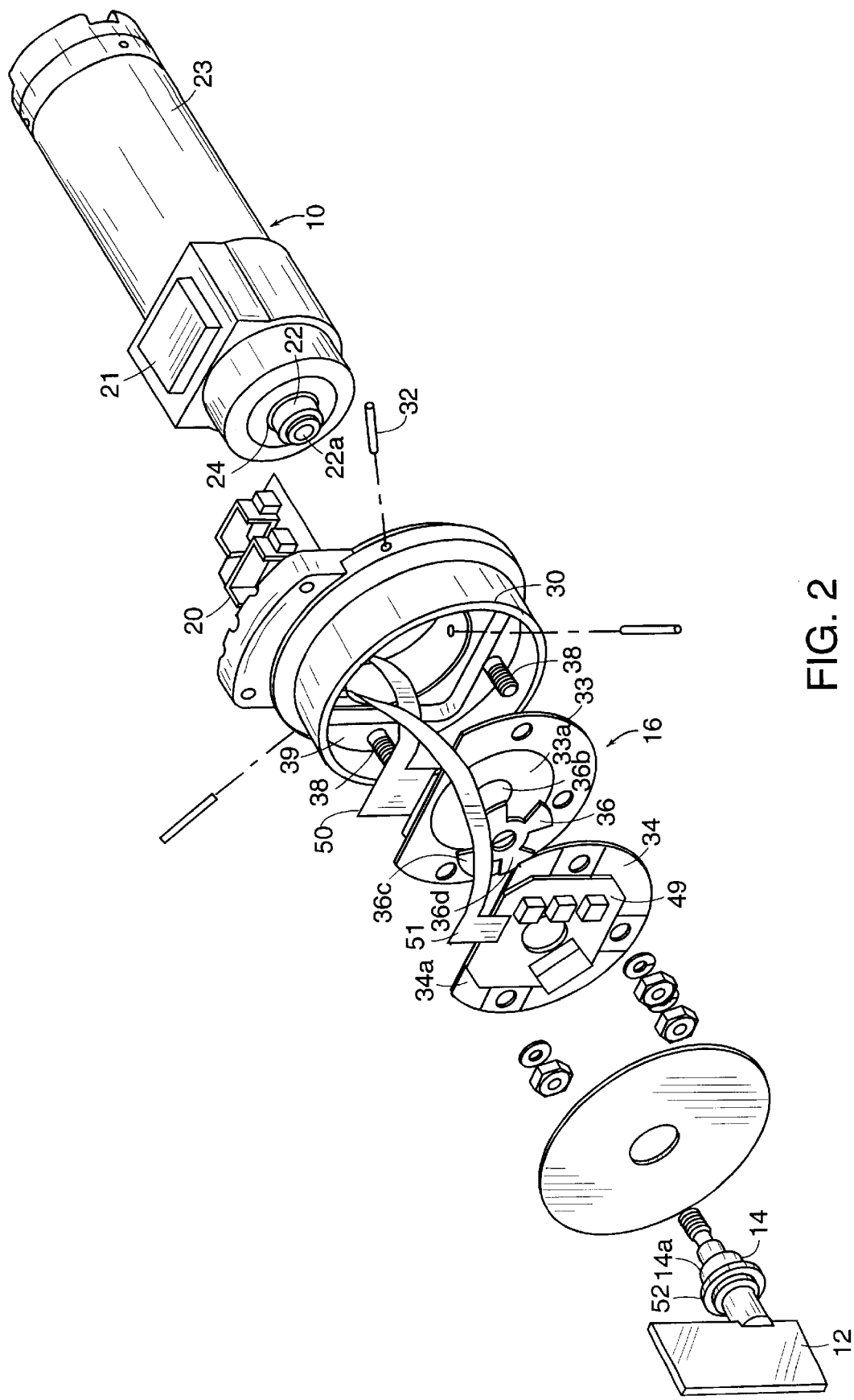
FIG. 2 is an exploded view of the scanner.

With reference to FIG. 2, the motor 10, which is enclosed in a housing 23, includes a stub shaft 22 extending from the motor armature (not shown in FIG. 2) at the front end of the motor. The shaft 22 rotates in a ball or roller bearing 24, which has inner and outer races (not shown). At the rear end of the motor, the armature is similarly supported by a shaft and a bearing (not shown). The shaft 14 has a threaded end that is threaded into a bore 22a of the shaft 22 and preferably soldered in place. When connected in this manner, the shafts 14 and 22 function as a unitary shaft supporting the mirror 12.

The position sensor 16 has a cylindrical housing 30 that is fastened to the motor 10 by means of pins 32 at extend through the housing 30 into corresponding holes in the motor housing. The sensor unit includes a dielectric rotor 36 and a stator assembly comprising a pair of fixed stators 33 and 34. The stators 33 and 34 are fastened together and to the housing 30 by bolts 38 extending from a shoulder 39 in the housing.

Figure 3B:
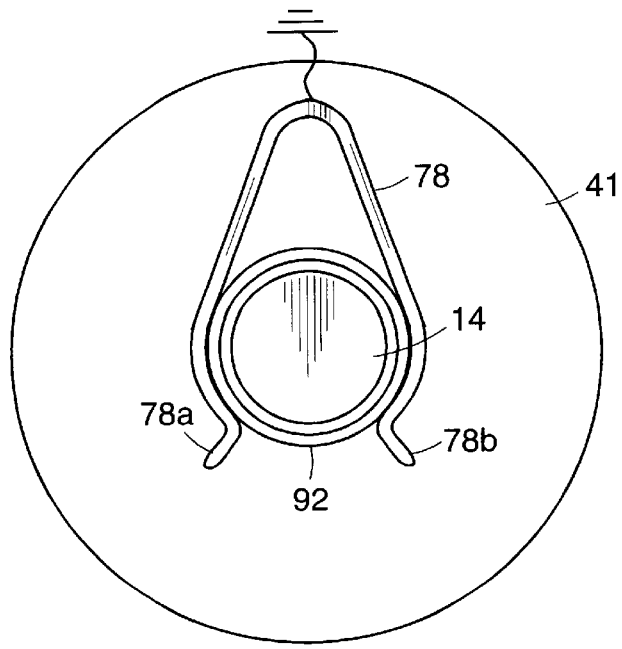
FIG. 3B illustrates the grounding brush used to ground the rotating parts.
Figure 3A:
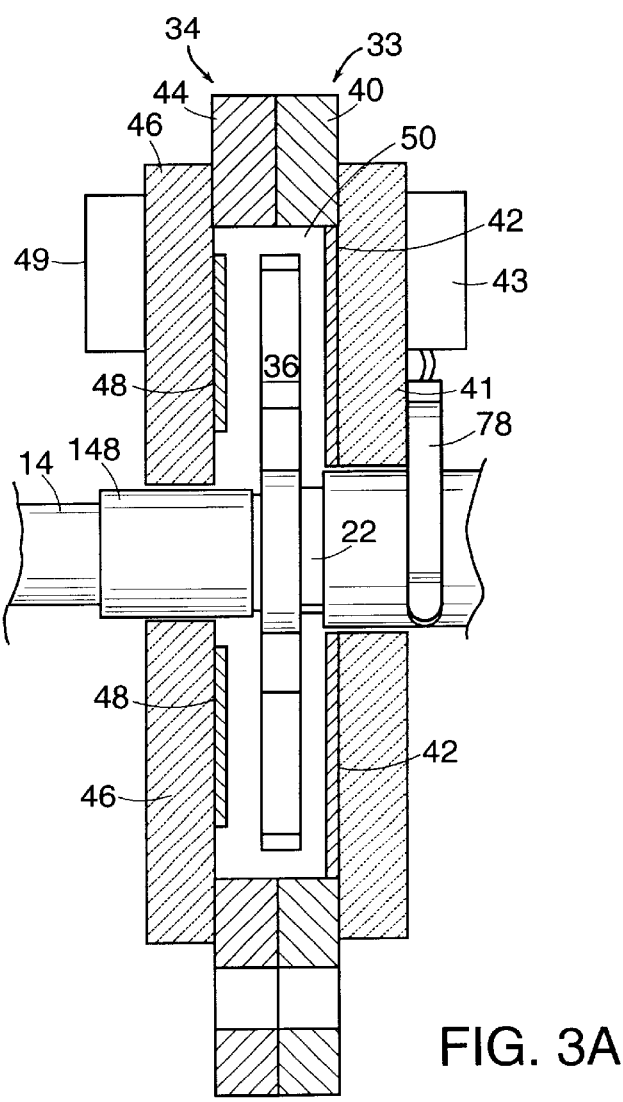
FIG. 3A is a longitudinal cross section of the position sensor used in the controller.

As best seen in FIG. 3A, the stator 33 comprises a metallic ring 40 to which a ceramic disk 41 is bonded. The inner surface of the disk 41 is covered with a continuous metallic layer to provide a common electrode 42 connected to an electronic module 43. Similarly, the stator 34 comprises a metallic ring 44 to which a ceramic disk 46 is bonded. The inner surface of the disk 40 carries a plurality of electrodes 48 connected to an electronic module 49 mounted on the opposite surface of the disk.

A cavity 50 between the disks 41 and 46 accommodates the rotor 36, which is affixed to the shaft 14 by compression between a shoulder 14a (FIG. 1) and the stub shaft 22 when the shaft 14 is assembled to the stub shaft.

The rotor 36 has a set of radially extending blades 36a–36d (FIG. 2) that function in a conventional differential-capacitor arrangement. For example, the module 43 may apply an AC signal to the electrodes 42, with the module 49 comparing the capacitive currents that pass through the rotor blades 36a–36d to the electrodes 48. Position sensor output signals and power for the sensor 16 pass between the controller 18 and the modules 43 and 49 by way of the terminal block 20 and ribbon cables 50 and 51.

The rotating system exhibits a torsional resonance which is a function of several parameters, such as the magnitudes and positions of the stiffnesses and moments of inertia in the rotating system. The fundamental resonance mode, which has the largest amplitude, is one in which the rotations of the motor armature and the mirror 12 are 180° out of phase, i.e., they rotate in opposite directions. Between these two components, there is a node at which there is zero rotation at the fundamental resonance frequency. The sensor rotor 36 is positioned at this node. Its output, therefore, contains a negligible component resulting from fundamental resonance mode of the rotating system. Accordingly, the position feedback from the sensor unit 16 to the servo components in the controller 18 is essentially devoid of this component and the bandwidth of the servo system can therefore extend through the fundamental resonance frequency.

It is impractical to determine the location of the null point of the fundamental resonance and then install the sensor rotor 36 at that location. Therefore, we prefer to tailor the shaft 14 to the mechanical characteristics of the mirror 12 so as to position the null point at the location of the sensor rotor 36. For example, if the mirror has a relatively large moment of inertia, the shaft 14 might be made stiffer than would be the case with a mirror having a smaller moment of inertia. This is a preferable arrangement for production of substantial quantities of identical scanners, since identical mirrors and identical shafts can be produced at relatively low cost.

On the other hand, for a single scanner one might assemble all the components of the scanner, with the rotor 36 positioned at a location known to be on the left (FIG. 2) of the null point. A mass in the form of a collar 52 is then secured around the shaft 14 so as to move the null point to the left. The collar is moved along the shaft until the null point is positioned at the sensor rotor 36. The correct collar position can be determined by energizing the motor 10 in an open loop configuration at the fundamental resonance frequency, and ascertaining the amplitude and phase of the output of the sensor unit 16. The collar 52 is moved accordingly and the process is repeated until there is a negligible output from the sensor unit 16.

Preferably, the sensor rotor 36 is made of ceramic material. It can thus be made thinner, yet stiffer, than the prior sensor rotors. Also with the rotor 36 and the stator disks 42 and 46 made of ceramic material, these parts are relatively thin and they also exhibit negligible dimensional changes in response to changes in temperature and humidity. This materially improves the stability and precision of the sensor. The gaps between the rotor 36 and the disks 42 and 46 can thus be made relatively thin, with a corresponding increase in the signal-to-noise ratio of the position sensor and shortening of the shaft 14. The reduced thickness of the rotor, stator disks and gaps allows a reduction in the overall size of the galvanometer assembly. Further, the shaft 14 can be shortened, resulting in increased shaft stiffness and a concomitant increase in the torsional resonant frequencies.

The controller 18 (FIG. 1) preferably includes a microprocessor 53 that operates in accordance with instructions stored in a non-volatile memory 54. The microprocessor positions the scanning mirror 12 in response to input commands at a terminal 18a. In a servo arrangement the controller 18 receives position feedback signals from the sensor unit 16 and uses these signals, together with the command signals in controlling the motor drive current. The controller 18 also includes other components, e.g. analog/digital and digital/analog converters (not shown in the circuit diagram).

In accordance with instructions recorded in the memory 54, the processor 53 records the total number of cycles of the limited rotation of the motor 10 in a register 55.

When the cycle count reaches a predetermined number, the controller causes the motor 10 to undergo one or more complete revolutions. This changes the relative ball-race positions in the bearings 24 so that wear on the bearing races is shifted to an angular range in unworn portions of the races. As set forth above, this prolongs the useful life of the bearings. The register 55 may be a hardware register as shown in FIG. 1, or, if the memory 52 is non-volatile, it may be a location in that memory.

Figure 4:
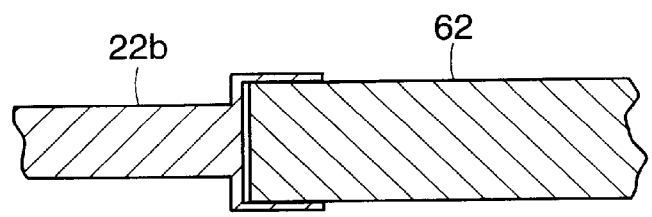
FIG. 4 illustrates a prior rotor, showing the connection between the motor armature and the stub shafts.

FIG. 4 illustrates a conventional mode of attachment of a motor armature 60 to the stub shafts 22. Each of the shafts is provided with a cup-like extension 22b that closely fits over an end of the armature 60. The parts are secured together by an intervening elastomeric adhesive. This arrangement results in relatively low thermal and electrical conductivity between the rotor 60 and the shaft 22. Moreover, the relatively low rigidity of the coupling between the rotor and shaft contributes to low torsional resonance frequencies of the rotating system.

Figure 5A:
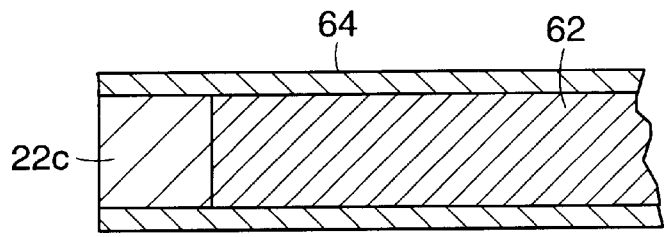
FIG. 5A depicts the rotor assembly prior to making it to final form.
Figure 5B:
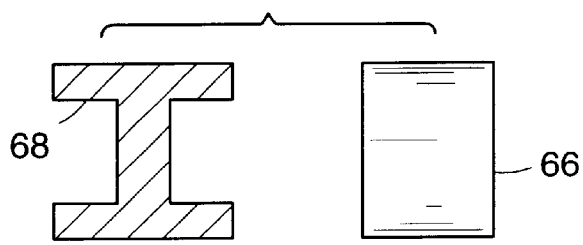
FIG. 5B illustrates configuration of a crush grinder used in guiding the rotor assembly.
Figure 5C:
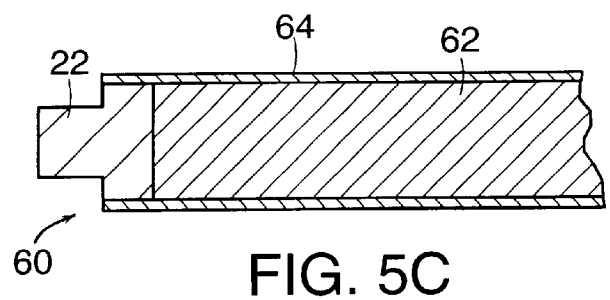
FIG. 5C depicts the finished rotor.

In FIGS. 5A–5C I have illustrated a novel rotor and a method of fabricating it that overcome these problems. As shown in FIG. 5A, cylindrical shaft blanks 22c are positioned against the ends of the armature 60. These parts are inserted into a sleeve 64 and secured to the sleeve with a high-conductivity solder such as a silver-tin eutectic. The solder bond covers the entire opposing surfaces of the sleeve 64 and the parts enclosed therein. The sleeve 64 is of a material, such as copper, characterized by high thermal and electrical conductivity.

Next, the assembly is ground on a centerless grinder. Finally, it is crush ground in a grinder whose cylinders are depicted in FIG. 5B. Specifically, the crush grinder comprises a grinding cylinder 66 in the form of a right cylinder and a cylinder 68 whose cross section is the negative of the axial cross section of the finished rotor. This results in a rotor 60, as depicted in FIG. 5C, in which the sleeve 64 provides a rigid connection between the shafts 22 and the armature 62, and, further, provides high thermal and electrical conductivity between the armature and the shafts. This provides a uniform temperature throughout the rotor and, further, permits grounding of rotor anywhere along its length.

A further advantage of the rotor construction is the conductive paths provided by the sleeve 64. They operate as a shorted turn that reduces the inductance of the armature windings and thus decreases the voltage required to drive the motor 10.

If the scanner is used in a two-axis system with separate scanners providing beam movement along the respective axes, rotation of the mirror 12 beyond a limited range during may cause contact between the mirror 12 and a mirror on the other scanner. Accordingly, mechanical stops are usually provided to prevent excessive rotation. In that case, the scanner will be removed from the two-scanner assembly, and the steps removed before undertaking full revolution of the motor 10. The stops must also be subsequently reassembled to the rotor. The structure depicted in FIGS. 7A–7C overcomes these problems.

Figure 7A:
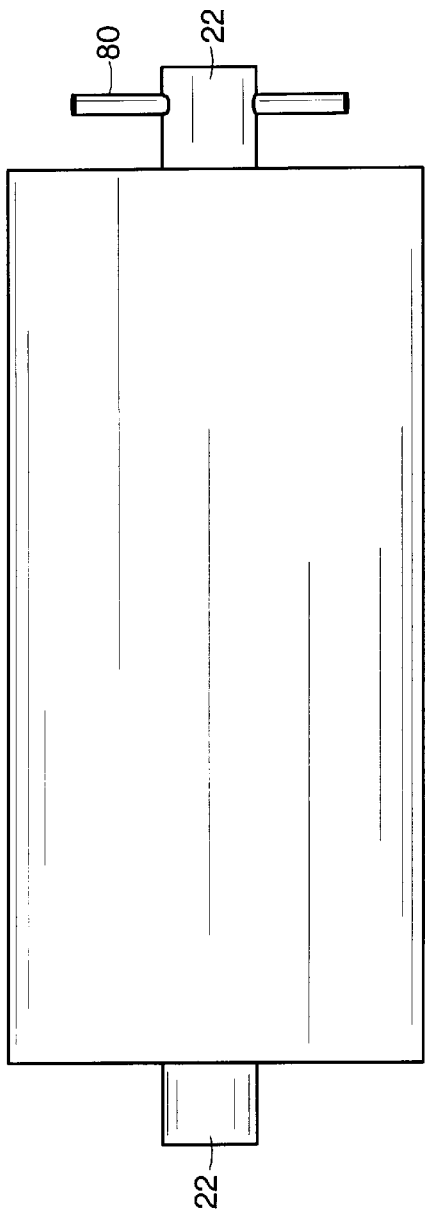
FIGS. 7A–7C depicts the stop mechanism used to limit rotation of the motor.
Figure 7B:
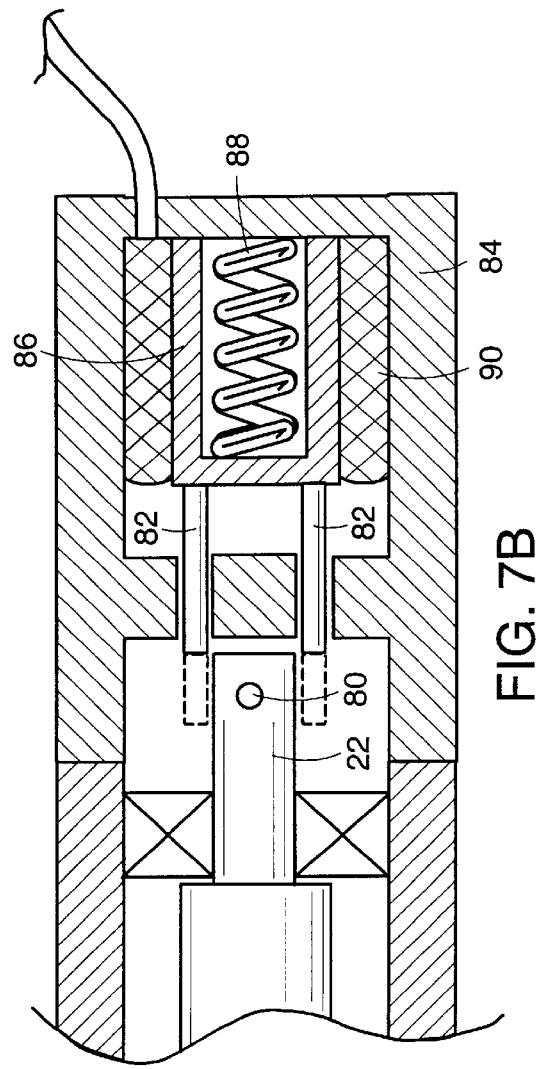

More specifically, as shown in FIG. 7A, a stop pin 80 extends through the rear motor shaft 22. The pin 80 coacts with a set of limit pins 82 disposed in a stop assembly 84 (FIG. 7B) affixed to the motor housing 23. The limit pins 82, which extend from a solenoid plunger 86, are arrayed as depicted in FIG. 7C, which in the solid line, depicts the pin 80 in the neutral position of the shaft 22 (FIG. 7A) and, in the dashed lines, the limits of rotation of the rotor defined by the positions of pins 82.

Figure 7C:
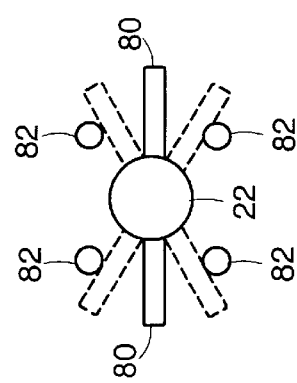

The plunger 86 is urged to the left (FIG. 7B) by a spring 88 to bring the limit pins 82 to the position shown by the dashed line, so that they limit rotation of the rotor 60 as depicted in FIG. 7C. In a two-axis system, the mirror on the other scanner is temporarily rotated to a position where it will not interfere with full rotation of the mirror 12 (FIG. 2). The solenoid coil 90 is then energized, either manually or by the controller 18, to retract the plunger 86 and the limit pins 82 to their illustrated position and thus permit full rotation, as described above, to change the relative positions of the races and balls and in bearings 24.

Figure 6:
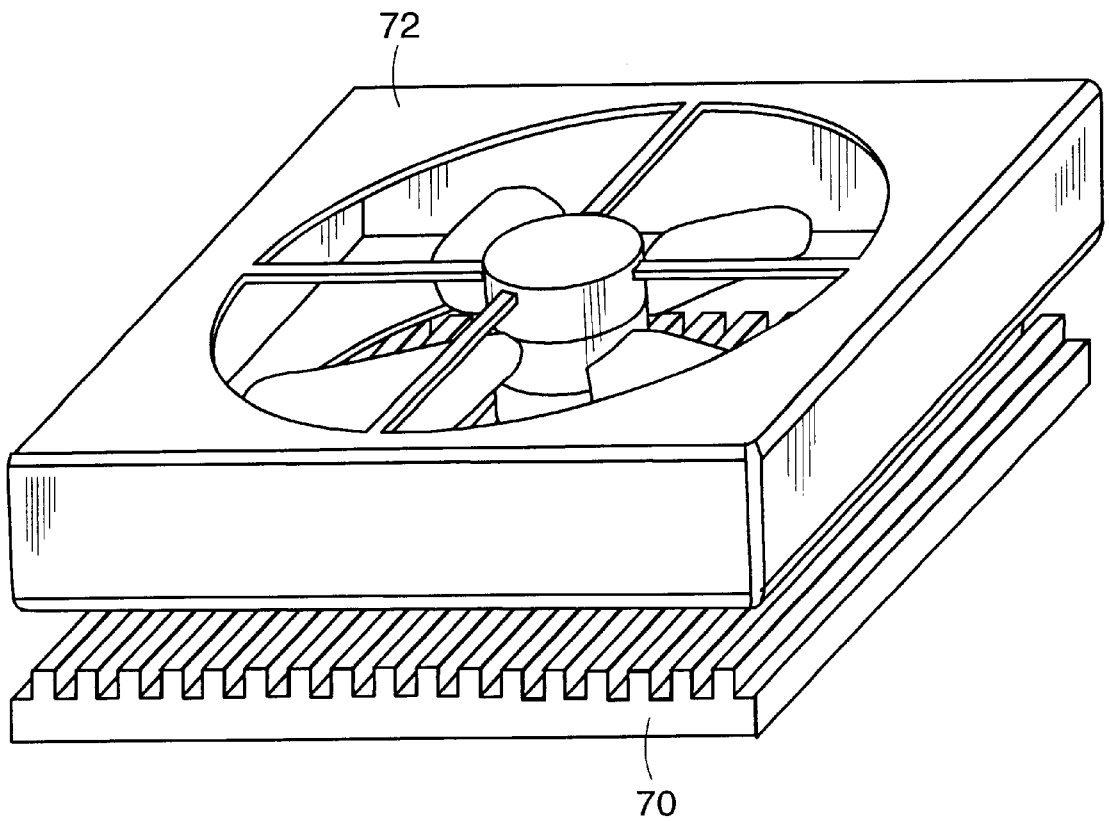
FIG. 6 is an enlarged view of the cooling module used to cool the galvanometer motor.

As shown in FIG. 6, the cooling module 21 includes a grooved plate 70 in close thermal contact with the motor 10 and a fan unit 72, positioned above the plate 70, that projects air toward the plate. The grooves in the plate 70 are relatively shallow, and, as is well known, this configuration provides efficient cooling with a negligible velocity of the air exiting from the module. With this arrangement, cooling of the motor 10 does not result in appreciable air currents in the optical path, which would degrade the accuracy with which the scanner positions light beams. Furthermore, it imparts negligible vibration to the system, thereby minimizing vibration as a source of error in positioning is the beam reflected by the mirror 12.

As shown in FIGS. 3A and 3B, connection of the rotor to system ground is accomplished by a brush 78, affixed to the rear surface of the ceramic disk 41, and connected to the electronic module 43. The brush 78 is a generally U-shaped spring fashioned from a material such as a gold alloy. A pair of inwardly extending contact bends 78a and 78b are thus urged inwardly against a slip ring 92, of like material, affixed to the shaft 14. This maintains a reliable electrical connection to the shaft 14 and thus with the entire rotor.

What is claimed is:

1. A galvanometer unit comprising:

A. a motor having a rotor comprising;
        1. an armature, and
        2. first and second shafts extending from said armature;
    B. a load element affixed to the end of said first shaft remote from said armature;
    C. a controller for causing the motor to reciprocally rotate the rotor, said controller including a servo system for controlling the angular position of the load element, said servo system including a position sensor for sensing the angular position of the shafts, the position sensor including;
        1. a sensor rotor attached to one of the shafts for rotation therewith, and
        2. a stator assembly for sensing the angular position of the sensor rotor; the sensor rotor being positioned at the null point of the fundamental torsional resonance of the rotating system that includes the motor rotor, the shafts and the load element.

2. The galvanometer unit defined in claim 1 including means for adjusting the position of the null point to coincide with the position of the sensor rotor on the shaft to which the rotor is attached.

3. The galvanometer unit defined in claim 1:

A. in which the stator assembly comprises first and second stators disposed around said shaft to which the rotor is attached, said stators having opposing faces and opposing electrodes on said faces;
    B. in which the rotor is;
        1. of a dielectric material;
        2. is affixed to one of said shafts between said opposing faces; and
        3. has radially extending blades; and
    C. including means for sensing the capacitances between said electrodes.

4. The galvanometer unit defined in claim 3:

A. including means for clamping said stators together
    B. including a cavity between the opposing electrodes; and
    C. in which said rotor is disposed in said cavity.

5. The galvanometer defined in claim 1:

A. including first and second bearings supporting the rotor for rotation, each of the bearings having an inner race and an outer race; and
    B. in which the controller includes means for providing full rotation of the armature at predetermined times, thereby to distribute wear on said bearings.

6. The galvanometer unit of claim 1 including a cooling unit for removing heat from said motor, said cooling unit comprising A. a heat-transfer surface of said motor,
    B. a heat-dissipation plate having a first surface in intimate thermal contact with said motor surface, and a second surface having fins projecting therefrom, and
    C. a fan projecting air toward said second surface, perpendicularly to said second surface, whereby air from said fan impinges on said second surface and flows outwardly therefrom along said fins.

* * * * *